(12) United States Patent
Kalmbach et al.

(10) Patent No.: US 9,975,417 B2
(45) Date of Patent: May 22, 2018

(54) CRAWLER VEHICLE AND RELATIVE CONTROL METHOD

(75) Inventors: Klaus Kalmbach, Luxembourg (LU); Mathias Lutz, Luxembourg (LU); Gianluca Milan, Luxembourg (LU); Alberto Giacometti, Luxembourg (LU); Martin Runggaldier, S. Cristina (IT)

(73) Assignee: PRINOTH S.P.A., Vipiteno (IT)

( * ) Notice: Subject to any disclaimer, the term of this patent is extended or adjusted under 35 U.S.C. 154(b) by 619 days.

(21) Appl. No.: 13/995,369

(22) PCT Filed: Dec. 22, 2011

(86) PCT No.: PCT/IB2011/055917
§ 371 (c)(1),
(2), (4) Date: Sep. 4, 2013

(87) PCT Pub. No.: WO2012/085882
PCT Pub. Date: Jun. 28, 2012

(65) Prior Publication Data
US 2013/0333958 A1    Dec. 19, 2013

(30) Foreign Application Priority Data
Dec. 22, 2010    (IT) .............................. MI2010A2358

(51) Int. Cl.
*B62D 11/00*    (2006.01)
*B60K 6/20*    (2007.10)
(Continued)

(52) U.S. Cl.
CPC ............... *B60K 6/20* (2013.01); *B60K 6/365* (2013.01); *B60K 6/445* (2013.01); *B60K 6/48* (2013.01);
(Continued)

(58) Field of Classification Search
CPC ............................... B62D 11/08; B62D 11/16
(Continued)

(56) References Cited

U.S. PATENT DOCUMENTS 4,405,029 A * 9/1983 Hunt ........................ B60K 6/24
180/303
4,470,476 A * 9/1984 Hunt ........................ B60K 6/26
180/65.25
(Continued)

FOREIGN PATENT DOCUMENTS

DE    296 07 651    8/1997
EP    1 747 929    1/2007
(Continued)

OTHER PUBLICATIONS

International Search Report and Written Opinion for International Application No. PCT/IB2011/055917 dated Mar. 14, 2012.
(Continued)

*Primary Examiner* — Joseph M Rocca
*Assistant Examiner* — Conan D Duda
(74) *Attorney, Agent, or Firm* — Neal, Gerber & Eisenberg LLP

(57) ABSTRACT

A crawler vehicle having a first and second track driven by a first and second drive wheel respectively; an internal combustion engine; a mechanical power transmission assembly extending from the internal combustion engine to the first and second drive wheel; an electric power transmission assembly; a mechanical power connection configured to transfer energy between the mechanical power transmission assembly and the electric power transmission assembly; and at least one mechanical power transmission configured to transfer energy between the electric power transmission assembly and the mechanical power transmission assembly; the electric power transmission assembly
(Continued)

extending from the mechanical power connection to the mechanical power transmission.

24 Claims, 2 Drawing Sheets

(51) Int. Cl.
    *B60K 6/365* (2007.10)
    *B60K 6/445* (2007.10)
    *B60K 6/48* (2007.10)
    *B62D 11/16* (2006.01)
    *B60L 11/14* (2006.01)

(52) U.S. Cl.
    CPC .............. *B60L 11/14* (2013.01); *B62D 11/16* (2013.01); *B60L 2200/40* (2013.01); *B60Y 2200/252* (2013.01); *Y02T 10/6221* (2013.01); *Y02T 10/6239* (2013.01); *Y02T 10/70* (2013.01); *Y02T 10/7077* (2013.01); *Y10S 903/91* (2013.01)

(58) Field of Classification Search
    USPC ................ 180/65.21, 665.22, 65.25
    See application file for complete search history.

(56) References Cited

U.S. PATENT DOCUMENTS

| | | | | |
|---|---|---|---|---|
| 5,120,282 A | * | 6/1992 | Fjallstrom | B60K 6/365 180/65.235 |
| 5,301,764 A | * | 4/1994 | Gardner | B60K 6/46 180/65.23 |
| 5,327,992 A | * | 7/1994 | Boll | B60K 6/48 180/65.25 |
| 5,775,449 A | * | 7/1998 | Moroto | B60K 6/365 180/65.235 |
| 6,573,745 B2 | * | 6/2003 | Raftari et al. | 324/765.01 |
| 7,140,461 B2 | * | 11/2006 | Morrow | B60K 6/387 180/65.245 |
| 8,083,016 B2 | * | 12/2011 | Naik | B60K 6/365 180/242 |
| 8,286,741 B2 | * | 10/2012 | Kawashima | B60K 6/485 180/65.28 |
| 8,567,549 B2 | * | 10/2013 | Kang | B60K 6/48 180/305 |
| 8,746,379 B2 | * | 6/2014 | Cantemir et al. | 180/65.245 |
| 8,768,578 B2 | * | 7/2014 | Kawashima | B60W 10/08 180/65.265 |
| 2007/0080236 A1 | * | 4/2007 | Betz et al. | 237/12.1 |
| 2007/0102209 A1 | * | 5/2007 | Doebereiner | B60K 6/365 180/65.23 |
| 2010/0190603 A1 | * | 7/2010 | Uchiyama | B60L 7/24 477/27 |
| 2010/0250039 A1 | * | 9/2010 | Bryan et al. | 701/22 |
| 2010/0252343 A1 | * | 10/2010 | Hilberer | 180/65.25 |
| 2010/0305795 A1 | * | 12/2010 | Kuang et al. | 701/22 |
| 2010/0307845 A1 | * | 12/2010 | Ogata | 180/65.22 |
| 2011/0000722 A1 | * | 1/2011 | Kawashima | B60K 6/485 180/65.28 |
| 2011/0036658 A1 | * | 2/2011 | Cantemir | B60K 6/40 180/246 |
| 2011/0237387 A1 | * | 9/2011 | Yang | 477/5 |
| 2011/0239659 A1 | * | 10/2011 | Lior | 60/783 |
| 2011/0281679 A1 | * | 11/2011 | Larrabee et al. | 475/5 |
| 2012/0082536 A1 | * | 4/2012 | Kawashima | B60W 10/08 414/694 |

FOREIGN PATENT DOCUMENTS

| | | | | |
|---|---|---|---|---|
| EP | 2270285 A2 | * | 1/2011 | ............ B60K 6/485 |
| FR | 2 922 163 | | 4/2009 | |
| WO | WO 99/21263 | | 4/1999 | |
| WO | WO2010143628 A1 | * | 1/2006 | ............ B60W 10/08 |
| WO | WO2008/048477 A2 | * | 4/2008 | ............ B62K 6/445 |

OTHER PUBLICATIONS

Notification Concerning Submission, Obtention or Transmittal of Priority Document (Form PCT/IB/304) dated Apr. 121, 2012.

* cited by examiner

CRAWLER VEHICLE AND RELATIVE CONTROL METHOD

PRIORITY CLAIM

This application is a national stage application of PCT/IB2011/055917, filed on Dec. 22, 2011, which claims the benefit of and priority to Italian Patent Application No. MI2010A002358, filed on Dec. 22, 2010, the entire contents of which are each incorporated by reference herein.

BACKGROUND

One type of known crawler vehicle is described in European Patent No. EP 0895495 B1.

The power transmission between the internal combustion engine and the demand assembly may be predominantly electric or electric, as described in PCT Patent Application No. WO 94/09548, U.S. Pat. No. 5,363,937 and PCT Patent Application No. WO 92/08278.

The electric power transmission normally comprises a first electric machine, in particular an electric generator; at least one second electric machine, in particular an electric motor; and an electric transmission line.

The internal combustion engine is connected by a shaft to the electric generator, which receives kinetic energy from the internal combustion engine and converts the kinetic energy to electric energy; and the electric motor receives electric energy from the electric generator via the electric transmission line, and converts the electric energy to kinetic energy.

Crawler vehicles with electric power transmissions are more efficient that hydraulic-transmission types, and also have the advantage, afforded by electric machines, of high torque at low engine speed. The efficiency of the vehicle, however, is not always fully satisfactory in all engine speed conditions.

SUMMARY

The present disclosure relates to a crawler vehicle and relative control method.

More specifically, the present disclosure relates to a crawler vehicle comprising a first and second track; an internal combustion engine; a power transmission configured to connect the first and second track to the internal combustion engine; a plurality of implements connected to the internal combustion engine by the power transmission; and a user interface.

It is an advantage of the present disclosure to enhance the efficiency of certain known crawler vehicles in terms of energy consumption.

According to the present disclosure, there is provided a crawler vehicle comprising a first and second track driven by a first and second drive wheel respectively; an internal combustion engine; a mechanical power transmission assembly extending from the internal combustion engine to the first and second drive wheel; an electric power transmission assembly; a mechanical power connection configured to transfer energy between the electric power transmission assembly and the mechanical power transmission assembly; and at least one mechanical power transmission configured to transfer energy between the electric power transmission assembly and the mechanical power transmission assembly; the electric power transmission assembly extending from the mechanical power connection to the mechanical power transmission.

By virtue of the mechanical power transmission assembly extending from the internal combustion engine to the first and second drive wheel, and to the electric power transmission assembly extending from the mechanical power connection to the mechanical power transmission, it is possible to enhance the efficiency of the crawler vehicle in any engine speed condition.

Another advantage of the present disclosure is to provide a crawler vehicle control method configured to enhance vehicle efficiency.

According to the present disclosure, there is provided a method of controlling a crawler vehicle comprising a first and second track driven by a first and second drive wheel respectively; an internal combustion engine; a mechanical power transmission assembly extending from the internal combustion engine to the first and second drive wheel; an electric power transmission assembly; a mechanical power connection; and at least one mechanical power transmission; the method comprising the steps of transferring energy between the mechanical power transmission assembly and the electric power transmission assembly utilizing the mechanical power connection; and transferring energy between the electric power transmission assembly and the mechanical power transmission assembly utilizing the mechanical power transmission.

Additional features and advantages are described in, and will be apparent from the following Detailed Description and the figures.

BRIEF DESCRIPTION OF THE DRAWINGS

A non-limiting embodiment of the present disclosure will be described by way of example with reference to the accompanying drawings, in which.

DETAILED DESCRIPTION

Figure 1:
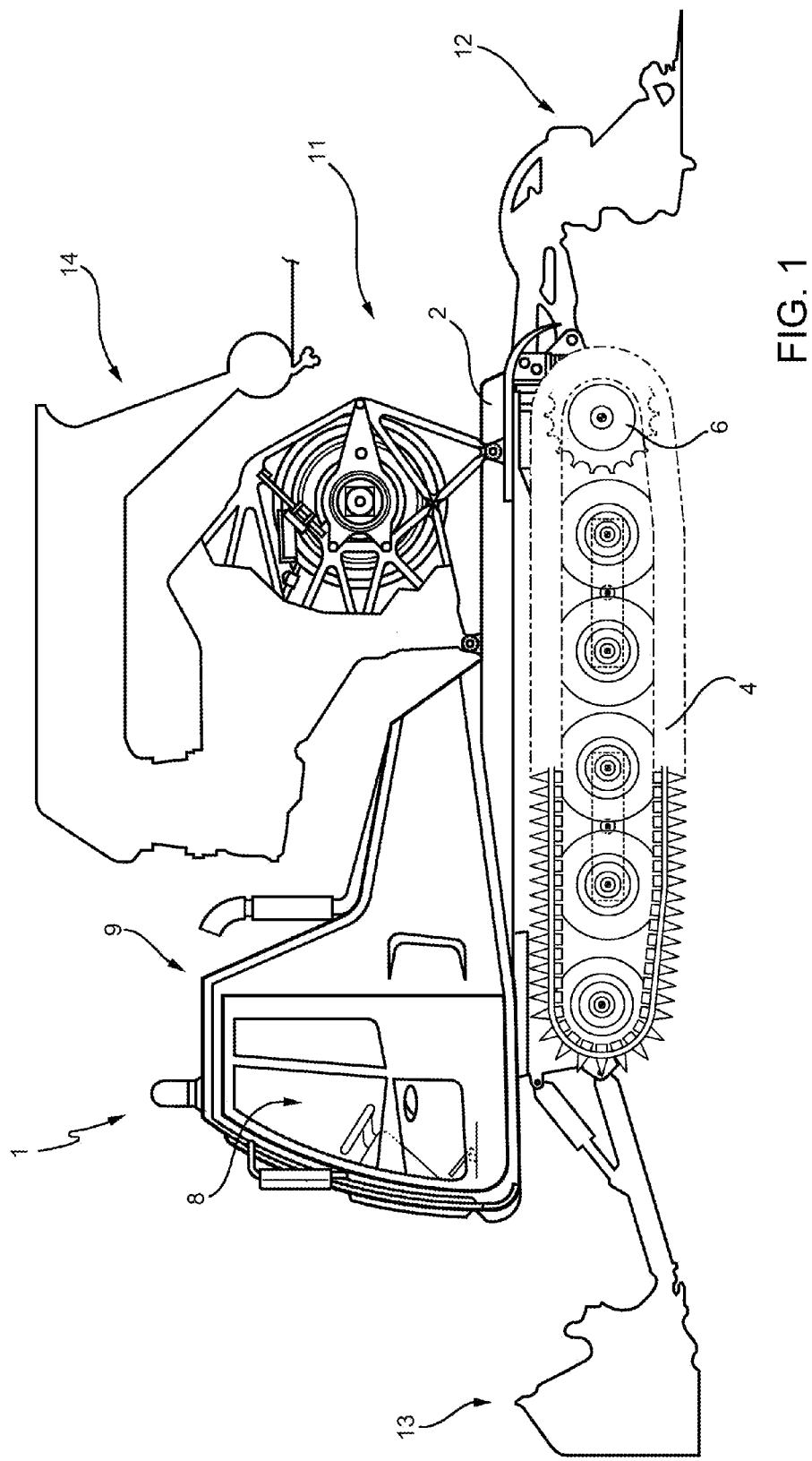
FIG. 1 shows a side view, with parts removed for clarity, of a crawler vehicle in accordance with the present disclosure.
Figure 2:
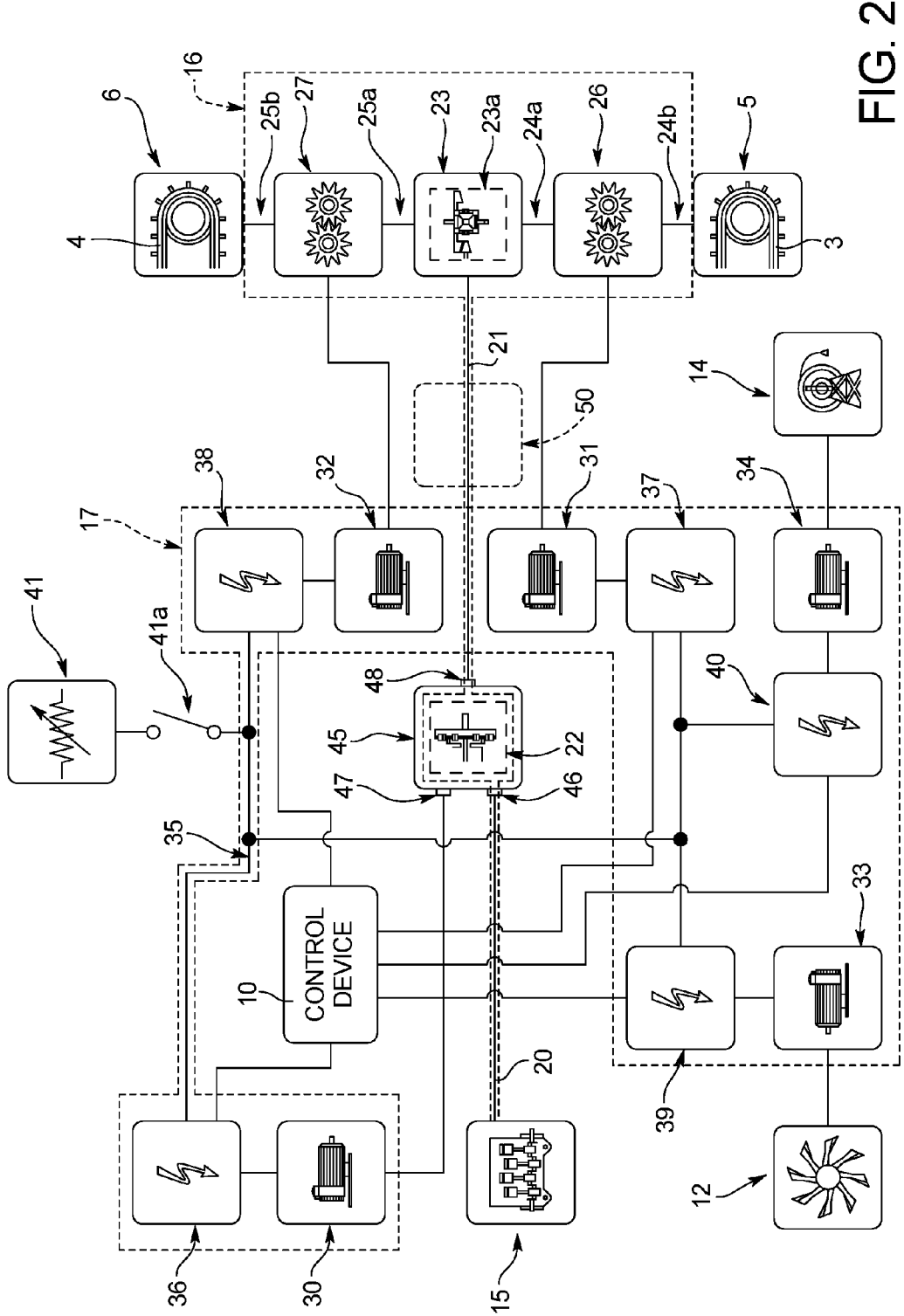
FIG. 2 shows a block diagram of the FIG. 1 crawler vehicle.

Referring now to the example embodiments of the present disclosure illustrated in FIGS. 1 to 2, number 1 in FIG. 1 indicates as a whole a crawler vehicle, which, in the example shown, is a ski slope groomer.

Crawler vehicle 1 comprises a frame 2; a track 3 (FIG. 2); a track 4; a drive wheel 5 (FIG. 2) and a drive wheel 6 independent of each other and connected to track 3 (FIG. 2) and track 4 respectively; a user interface 8; a cab 9; and a control device 10 (FIG. 2) communicating with user interface 8.

Crawler vehicle 1 comprises an accessories assembly 11 comprising a tiller 12, a blade 13, and a winch 14.

With reference to FIG. 2, crawler vehicle 1 comprises an internal combustion engine 15, such as a diesel engine; and a mechanical power transmission assembly 16 and electric power transmission assembly 17 configured to connect internal combustion engine 15 to drive wheels 5, 6 and to accessories assembly 11 (FIG. 1).

Control device 10 communicates with internal combustion engine 15 to control its power output.

Mechanical power transmission assembly 16 comprises two shafts 20, 21, a gear train 22, a mechanical member 23, two axle shafts 24, 25, and two mechanical power transmissions 26, 27.

Electric power transmission assembly 17 comprises five electric machines 30, 31, 32, 33, 34; an electric transmission line 35; and five actuating devices 36, 37, 38, 39, 40, which are connected electrically to respective electric machines 30, 31, 32, 33, 34, define an actuating device assembly, and communicate with control device 10.

Crawler vehicle 1 comprises a variable resistor 41 and a switch 41a, both connected electrically to electric transmission line 35. Control device 10 communicates with switch 41a to connect variable resistor 41 to electric transmission line 35, and communicates with variable resistor 41 to control the impedance of variable resistor 41.

Shaft 20 connects, and so transfers kinetic energy from, internal combustion engine 15 to gear train 22, which, in the example shown, is an epicyclic gear train 45 comprising a carrier 46, a sun gear 47, and a ring gear 48. Shaft 20 is connected mechanically to carrier 46 of epicyclic gear train 45; electric machine 30 is connected mechanically to sun gear 47 of epicyclic gear train 45; and shaft 21 is connected mechanically at one end to ring gear 48 of epicyclic gear train 45, and at the other end to mechanical member 23, which in turn is connected mechanically, to transfer power, to both drive wheels 5 and 6.

More specifically, mechanical member 23 is connected mechanically to drive wheel 5 by axle shaft 24, and to drive wheel 6 by axle shaft 25, and comprises a differential 23a configured to transfer kinetic energy from shaft 21 to axle shafts 24, 25.

Axle shaft 24 comprises two axle shaft portions 24a and 24b, between which mechanical power transmission 26 is interposed and connected mechanically to electric machine 31 to receive/supply kinetic energy from/to electric machine 31.

Likewise, axle shaft 25 comprises two axle shaft portions 25a and 25b, between which mechanical power transmission 27 is interposed and connected mechanically to electric machine 32 to receive/supply kinetic energy from/to electric machine 32.

Each of mechanical power transmissions 26 and 27 may be a gear train, or a cog belt drive, or a chain drive.

Electric machine 30 and actuating device 36 are configured so that electric machine 30 operates as an electric generator or electric motor. When operated as an electric generator, electric machine 30 is driven by sun gear 47 of epicyclic gear train 45, and supplies electric power to electric machines 31, 32, 33 and 34 over electric transmission line 35. When operated as an electric motor, electric machine 30 is powered electrically by electric transmission line 35, and supplies kinetic energy to gear train 22 utilizing sun gear 47. In which case, the kinetic energy may be used to power shaft 21, and therefore drive wheels 5 and 6; or to power shaft 20 to start internal combustion engine 15.

Electric machine 33 is connected electrically to electric transmission line 35, and mechanically to tiller 12 to transfer kinetic energy to tiller 12; and electric machine 34 is connected electrically to electric transmission line 35, and mechanically to winch 14 to transfer kinetic energy to winch 14.

Electric machines 31 and 32 are connected electrically to electric machine 30 by electric transmission line 35; electric machine 31 is connected mechanically to drive wheel 5 by mechanical power transmission 26; and electric machine 32 is connected mechanically to drive wheel 6 by mechanical power transmission 27.

In actual use, gear train 22 defines a mechanical power connection to transfer energy from/to electric power transmission assembly 17.

More specifically, the mechanical power connection is defined by sun gear 47.

When starting and running crawler vehicle 1 at low travelling speed (up to roughly 5 km/h), control device 10 acts on the actuating device assembly so that the power from internal combustion engine 15 is supplied mostly or entirely to electric machine 30, and only a small part or none at all to mechanical member 23. More specifically, control device 10 acts on actuating device 36 to regulate the resisting torque applied to sun gear 47 by electric machine 30. Electric machines 31, 32 receive electric power from electric machine 30, and power respective drive wheels 5 and 6 via respective mechanical power transmissions 26 and 27. Performance and consumption of crawler vehicle 1 is thus optimized by electric machines 31 and 32, which provide for high torque at low engine speed, and enable internal combustion engine 15 to operate independently of the travelling speed of crawler vehicle 1 and so reduce vehicle consumption.

At high travelling speed (roughly 25 km/h), control device 10 acts on the actuating device assembly so that the kinetic energy from internal combustion engine 15 is distributed mostly or entirely to mechanical member 23, and only a small part or none at all to electric machine 30. More specifically, control device 10 acts on actuating device 36 to regulate the resisting torque applied to sun gear 47 by electric machine 30, so that internal combustion engine 15 mainly powers drive wheels 5 and 6 via gear train 22 and mechanical member 23. That is, the power from internal combustion engine 15 is supplied directly to drive wheels 5 and 6, with no further power conversion.

At speeds between high and low travelling speed, control device 10 acts on the actuating device assembly to share the power from internal combustion engine 15 between mechanical member 23 and electric machine 30 according to a given or designated equation which takes into account the travelling speed of crawler vehicle 1. The given or designated equation, for example, may be an exponential power share, whereby the power share supplied directly to mechanical member 23 increases, and hence the power share supplied to electric machine 30 decreases, exponentially as the travelling speed of crawler vehicle 1 increases.

By way of another example, the given or designated equation may be a directly proportional power share, whereby the power share supplied directly to mechanical member 23 increases, and hence the power share supplied to electric machine 30 decreases, in direct proportion to an increase in the travelling speed of crawler vehicle 1.

In other words, at startup, drive wheels 5 and 6 are powered mainly by electric machines 31 and 32, and, at high speed, mainly by mechanical member 2 (i.e., directly by internal combustion engine 15), with no power conversion. At intermediate speeds, as speed increases from startup to maximum speed, the power drawn by electric machine 30 decreases, and the power drawn by mechanical member 23 increases, so less power is supplied to electric machines 31 and 32, and more power is supplied to mechanical member 23. It should be appreciated that, over most of the operating speed range of crawler vehicle 1, power to drive wheels 5 and 6 is supplied by both mechanical member 23 and electric machines 31, 32, so electric power transmission assembly 17 and mechanical power transmission assembly 16 operate "parallel" along at least a portion of mechanical power transmission assembly 16.

Electric power transmission assembly 17 and mechanical power transmission assembly 16 therefore transfer energy simultaneously or alternately to drive wheels 5 and 6. More specifically, at high speed, electric power transmission assembly 17 is substantially idle as regards driving crawler vehicle 1; at low speed, mechanical power transmission assembly 16 is at least partly idle; and, at intermediate speeds, mechanical power transmission assembly 16 and electric power transmission assembly 17 are both active simultaneously.

Electric machines 31 and 32 can be run independently to control turning of crawler vehicle 1.

At low speed, when power is transmitted mainly by electric power transmission assembly 17, turning is controlled by control device 10 controlling the actuating device assembly—in particular, actuating devices 36 and 37—to change the rotor speed of electric machine 31 with respect to that of electric machine 32. For example, to turn right, control device 10 controls actuating device 37 and/or actuating device 38 to reduce the rotor speed of electric machine 31 with respect to that of electric machine 32, and vice versa.

At intermediate or high speed, at which drive wheels 5 and 6 are powered mainly by mechanical member 23, turning is controlled by control device 10 acting on actuating devices 36 and 37, so that electric machine 31 or 32 operates as a generator, (i.e., draws kinetic energy from mechanical power transmission 26 or 27), depending on whether a right or left turn is required, and so reduces the rotation speed of axle shaft 24 or 25.

The power generated by electric machine 31 or 32 is supplied to electric machine 30, which generates and supplies kinetic energy to gear train 22 via sun gear 47.

In an alternative version of the present disclosure, when turning, control device 10 acts on electric machine 32 or 31 so that electric machine operates as an electric motor, (i.e., supplies kinetic energy to mechanical power transmission 27 or 26), and the electric power generated by electric machine 31 or 32 powers electric machine 32 or 31.

In these cases, turning is performed with very little power dissipation, caused solely by parasitic Joule-effect losses, with no other power wastage, on account of kinetic energy being drawn on the one hand, and supplied on the other, thus enhancing the efficiency of crawler vehicle 1 with respect to the known art.

In an alternative version of the present disclosure, when turning, the electric power generated by electric machine 31 or 32 is dissipated by variable resistor 41.

When reversing crawler vehicle 1, control device 10 acts on the actuating device assembly so that the power from internal combustion engine 15 is supplied entirely to electric machine 30, and none to mechanical member 23; and electric power is transferred to electric machines 31 and 32 over electric transmission line 35, so drive wheels 5 and 6 are powered solely by electric power transmission assembly 17, and in particular by electric machines 31 and 32.

In an alternative version of the present disclosure, shaft 21 is fitted with a reverser 50 (shown by the dash block in FIG. 2) configured to invert rotation of shaft 21, so that, when travelling in reverse, kinetic energy is also transferred to drive wheels 5 and 6 by shaft 21 in the same way as when travelling forward.

The advantages of the present disclosure in terms of enhancing the efficiency of the crawler vehicle will be clear from the above description.

The present disclosure also covers embodiments not described in detail herein, as well as equivalent embodiments within the protective scope of the accompanying Claims. That is, changes may be made to the present disclosure without, however, departing from the scope of the present disclosure as defined in the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A crawler vehicle comprising:
a first track driven by a first drive wheel;
a second track driven by a second drive wheel;
an internal combustion engine;
an electric power transmission assembly;
a mechanical power transmission assembly extending from the internal combustion engine to the first drive wheel and the second drive wheel, said mechanical power transmission assembly including a mechanical power transmission which the electric power transmission assembly extends to and a mechanical power connection which the electric power transmission assembly extends from, wherein:
(A) when the crawler vehicle is travelling at a first determined traveling speed:
(i) a first amount of energy is transferred, via the mechanical power connection, from the internal combustion engine to the electric power transmission assembly, wherein the mechanical power transmission is configured to transfer at least part of the first amount of energy from the electric power transmission assembly to the mechanical power transmission assembly, and
(ii) a second amount of energy is transferred, via the mechanical power connection, from the internal combustion engine to the mechanical power transmission assembly, wherein the first amount of energy is greater than the second amount of energy; and
(B) when the crawler vehicle is travelling at a second determined traveling speed:
(i) a third amount of energy is transferred, via the mechanical power connection, from the internal combustion engine to the electric power transmission assembly, and
(ii) a fourth amount of energy is transferred, via the mechanical power connection, from the internal combustion engine to the mechanical power transmission assembly, wherein the third amount of energy is less than the fourth amount of energy.

2. The crawler vehicle of claim 1, wherein the electric power transmission assembly is parallel to a portion of the mechanical power transmission assembly.

3. The crawler vehicle of claim 1, wherein the mechanical power transmission assembly and the electric power transmission assembly are configured to transfer energy simultaneously and alternately, to the first drive wheel and the second drive wheel.

4. The crawler vehicle of claim 1, wherein the mechanical power transmission assembly and the electric power transmission assembly are configured to transfer energy simultaneously to the first drive wheel and the second drive wheel.

5. The crawler vehicle of claim 1, wherein the mechanical power transmission assembly includes:
a mechanical member configured to drive the first drive wheel and the second drive wheel;
a first gear train which defines said mechanical power connection and is configured to share energy from the internal combustion engine between the mechanical member and the electric power transmission assembly; and a first shaft configured to connect the internal combustion engine to the first gear train.

6. The crawler vehicle of claim 5, wherein the mechanical power transmission assembly includes a second shaft configured to connect the first gear train to the mechanical member, said second shaft is interposed between one of the first drive wheel and the second drive wheel and the first gear train.

7. The crawler vehicle of claim 5, wherein the first gear train includes an epicyclic gear train.

8. The crawler vehicle of claim 7, wherein the electric power transmission assembly includes a first electric machine and the epicyclic gear train includes a sun gear coupled to the first electric machine.

9. The crawler vehicle of claim 7, wherein the epicyclic gear train includes:
   a carrier coupled to the internal combustion engine; and
   a ring gear coupled to the first drive wheel and the second drive wheel.

10. The crawler vehicle of claim 1, wherein the electric power transmission assembly includes:
    a first electric machine coupled to the mechanical power connection; and
    two second electric machines independently coupled to the first drive wheel and the second drive wheel respectively, and electrically connected to the first electric machine.

11. The crawler vehicle of claim 10, wherein the mechanical power transmission is configured to independently couple the first electric machine and the second electric machine to the first drive wheel and the second drive wheel, respectively.

12. The crawler vehicle of claim 1, wherein the electric power transmission assembly includes: a first electric machine coupled to the internal combustion engine, and a first actuating device configured to operate the first electric machine; and which includes a control device configured to control the first actuating device to share energy from the internal combustion engine between the mechanical power transmission assembly and the electric power transmission assembly based on the determined travelling speed of the crawler vehicle.

13. The crawler vehicle of claim 12, wherein the electric power transmission assembly includes:
    two second electric machines coupled to the first drive wheel and the second drive wheel, respectively; and
    two second actuating devices configured to operate the two second electric machines; and
    wherein the control device is configured to control the two second actuating devices to share energy from the electric power transmission assembly between the two second electric machines.

14. The crawler vehicle of claim 13, wherein the control device is configured to control one of the two second actuating devices such that one of the second electric machines operates as an electric generator.

15. The crawler vehicle of claim 14, wherein the control device is configured to control one of: the other of the two second actuating devices and the first actuating device such that one of: the other of the second electric machines and the first electric machine operates as an electric motor and is powered by one of the second electric machines.

16. A method of controlling a crawler vehicle including a first track driven by a first drive wheel, a second track driven by a second drive wheel, an internal combustion engine, a mechanical power transmission assembly extending from the internal combustion engine to the first drive wheel and the second drive wheel and including least one mechanical power transmission, an electric power transmission assembly, and a mechanical power connection, the method comprising:

(a) when the crawler vehicle is travelling at a first determined traveling speed, transferring:
   (i) a first amount of energy from the mechanical power transmission assembly to the electric power transmission assembly utilizing the mechanical power connection, and
   (ii) a second, amount of energy from the electric power transmission assembly to the mechanical power transmission assembly utilizing the mechanical power connection, wherein the first amount of energy is greater than the second amount of energy; and (b) when the crawler vehicle is travelling at a second determined traveling speed, transferring:
   (i) a third amount of energy from the electric power transmission assembly to the mechanical power transmission assembly utilizing the mechanical power transmission, and
   (ii) a fourth amount of energy from the mechanical power transmission assembly to the electric power transmission assembly utilizing the mechanical power transmission, wherein the fourth amount of energy is greater than the first amount of energy.

17. The method of claim 16, further comprising alternately transferring energy from the internal combustion engine to the first drive wheel and the second drive wheel utilizing the mechanical power transmission assembly and the electric power transmission assembly.

18. The method of claim 16, further comprising simultaneously transferring energy from the internal combustion engine to the first drive wheel and the second drive wheel utilizing the mechanical power transmission assembly and the electric power transmission assembly.

19. The method of claim 16, wherein the mechanical power transmission assembly includes a mechanical member configured to transfer mechanical energy from the internal combustion engine to the first track and the second track and which includes sharing energy from the internal combustion engine between the mechanical member and the electric power transmission assembly based on the determined travelling speed of the crawler vehicle.

20. The method of claim 16, wherein the electric power transmission assembly includes a first electric machine coupled to the internal combustion engine, and two second electric machines coupled to the first drive wheel and the second drive wheel and electrically connected to the first electric machine, and which includes transferring energy independently to the first drive wheel and the second drive wheel utilizing the two second electric machines, respectively.

21. The method of claim 20, further comprising transferring energy from the internal combustion engine to the first electric machine.

22. The method of claim 20, further comprising generating electric energy utilizing one of the two second electric machines.

23. The method of claim 22, further comprising powering one of: the other of the two second electric machines and the first electric machine with the electric energy generated by said one of the two second electric machines.

24. A crawler vehicle comprising:
a first track driven by a first drive wheel,
a second track driven by a second drive wheel;
an internal combustion engine;
a mechanical power transmission assembly extending from the internal combustion engine to the first drive wheel and the second drive wheel;
an electric power transmission assembly; and
a control device configured to:
- (a) when travelling at a first travelling speed:
  - (i) transfer a first amount of power from the internal combustion engine to the electric power transmission assembly, and
  - (ii) transfer a second amount of power from the internal combustion engine to the mechanical power transmission assembly, wherein the first amount of power is greater than the second amount of power, and
- (b) when travelling at a second travelling speed:
  - (i) transfer a third amount of power from the internal combustion engine to the electric power transmission assembly, and
  - (ii) transfer a fourth amount of power from the internal combustion engine to the mechanical power transmission assembly, wherein the third amount of power is less than the fourth amount of power and the second travelling speed is greater than the first travelling speed.

* * * * *